(12) United States Patent
Rodrigues et al.

(10) Patent No.: US 10,075,284 B1
(45) Date of Patent: Sep. 11, 2018

(54) PULSE WIDTH MODULATION (PWM) TO ALIGN CLOCKS ACROSS MULTIPLE SEPARATED CARDS WITHIN A COMMUNICATION SYSTEM

(71) Applicant: Integrated Device Technology, Inc., San Jose, CA (US)

(72) Inventors: Silvana Rodrigues, Ottawa (CA); Michael Rupert, Ottawa (CA); Zaher Baidas, Kanata (CA); Leon Goldin, Otttawa (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 43 days.

(21) Appl. No.: 15/364,602

(22) Filed: Nov. 30, 2016

Related U.S. Application Data (60) Provisional application No. 62/281,332, filed on Jan. 21, 2016.

(51) Int. Cl.
| | |
|---|---|
| *H04L 7/00* | (2006.01) |
| *H04L 7/033* | (2006.01) |
| *H04L 25/49* | (2006.01) |
| *H04L 12/935* | (2013.01) |

(52) U.S. Cl.
CPC .......... *H04L 7/033* (2013.01); *H04L 25/4902* (2013.01); *H04L 49/30* (2013.01)

(58) Field of Classification Search
CPC ...... H04L 7/033; H04L 49/30; H04L 25/4902
USPC .................................. 375/371, 356; 710/310
See application file for complete search history.

(56) References Cited

U.S. PATENT DOCUMENTS

| | | | |
|---|---|---|---|
| 4,684,941 A | 8/1987 | Smith et al. | |
| 4,862,485 A | 8/1989 | Guinea et al. | |
| 5,388,060 A | 2/1995 | Adams et al. | |
| 5,663,105 A | 9/1997 | Sua et al. | |
| 5,748,949 A | 5/1998 | Johnston et al. | |
| 5,757,240 A | 5/1998 | Boerstler et al. | |
| 5,848,355 A | 12/1998 | Rasor et al. | |
| 5,903,195 A | 5/1999 | Lukes et al. | |
| 5,987,539 A * | 11/1999 | Goodrum ............ | G06F 13/4045 710/310 |
| 6,219,797 B1 | 4/2001 | Liu et al. | |
| 6,259,327 B1 | 7/2001 | Balistreri et al. | |
| 6,640,311 B1 | 10/2003 | Knowles | |
| 6,643,787 B1 | 11/2003 | Zerbe et al. | |
| 6,650,193 B2 | 11/2003 | Endo et al. | |

(Continued)

OTHER PUBLICATIONS

"19-Output PCIE Gen 3 Buffer", Si53019-A01A, Silicon Laboratories Inc., Rev. 1.1 May 2015, 34 Pages.

(Continued)

*Primary Examiner* — Chieh M Fan
*Assistant Examiner* — Fitwi Hailegiorgis
(74) *Attorney, Agent, or Firm* — Glass & Associates; Kenneth Glass (57) ABSTRACT

A system and method for clock phase alignment at a plurality of line cards over a backplane of a communication system. Phase adjustments are continually made for the clock signals at the line cards by dynamically measuring the propagation delay between the timing device and each of the plurality of line cards and continuously communicating the appropriate phase adjustment to each of the plurality of line cards.

14 Claims, 4 Drawing Sheets

(56) References Cited

U.S. PATENT DOCUMENTS

| | | | |
|---|---|---|---|
| 6,683,506 B2 | 1/2004 | Ye et al. |
| 6,727,767 B2 | 4/2004 | Takada |
| 6,768,387 B1 | 7/2004 | Masuda et al. |
| 6,870,411 B2 | 3/2005 | Shibahara et al. |
| 6,959,066 B2 | 10/2005 | Wang et al. |
| 7,012,476 B2 | 3/2006 | Ogiso |
| 7,323,916 B1 | 1/2008 | Sidiropoulos et al. |
| 7,405,594 B1 | 7/2008 | Xu |
| 7,434,083 B1 | 10/2008 | Wilson |
| 7,541,848 B1 | 6/2009 | Masuda |
| 7,545,188 B1 | 6/2009 | Xu et al. |
| 7,573,303 B1 | 8/2009 | Chi et al. |
| 7,586,347 B1 | 9/2009 | Ren et al. |
| 7,590,163 B1 | 9/2009 | Miller et al. |
| 7,671,635 B2 | 3/2010 | Fan et al. |
| 7,714,565 B2 | 5/2010 | Abuhamdeh et al. |
| 7,737,739 B1 | 6/2010 | Bi |
| 7,741,981 B1 | 6/2010 | Wan et al. |
| 7,750,618 B1 | 7/2010 | Fang et al. |
| 7,756,197 B1 | 7/2010 | Ferguson et al. |
| 7,786,763 B1 | 8/2010 | Bal et al. |
| 7,800,422 B2 | 9/2010 | Lee et al. |
| 7,816,959 B1 | 10/2010 | Isik |
| 7,882,404 B2 | 2/2011 | Dai et al. |
| 7,907,625 B1 | 3/2011 | MacAdam |
| 7,928,880 B2 | 4/2011 | Tsukamoto |
| 7,941,723 B1 | 5/2011 | Lien et al. |
| 8,010,072 B1 | 8/2011 | Nathawad |
| 8,018,289 B1 | 9/2011 | Hu et al. |
| 8,164,367 B1 | 4/2012 | Bal et al. |
| 8,179,952 B2 | 5/2012 | Thurston et al. |
| 8,188,796 B2 | 5/2012 | Zhu et al. |
| 8,259,888 B2 | 9/2012 | Hua et al. |
| 8,284,816 B1 | 10/2012 | Clementi |
| 8,305,154 B1 | 11/2012 | Kubena et al. |
| 8,416,107 B1 | 4/2013 | Wan et al. |
| 8,432,231 B2 | 4/2013 | Nelson et al. |
| 8,436,677 B2 | 5/2013 | Kull et al. |
| 8,456,155 B2 | 6/2013 | Tamura et al. |
| 8,471,751 B2 | 6/2013 | Wang |
| 8,537,952 B1 | 9/2013 | Arora |
| 8,693,557 B1 | 4/2014 | Zhang et al. |
| 8,704,564 B2 | 4/2014 | Hasegawa et al. |
| 8,723,573 B1 | 5/2014 | Wang et al. |
| 8,791,763 B2 | 7/2014 | Taghivand |
| 8,896,476 B2 | 11/2014 | Harpe |
| 8,933,830 B1 | 1/2015 | Jeon |
| 8,981,858 B1 | 3/2015 | Grivna et al. |
| 9,077,386 B1 | 7/2015 | Holden et al. |
| 9,100,232 B1 | 8/2015 | Hormati et al. |
| 9,455,854 B2 | 9/2016 | Gao |
| 9,479,182 B1 | 10/2016 | Baidas et al. |
| 2002/0079937 A1 | 6/2002 | Xanthopoulos |
| 2002/0191727 A1 | 12/2002 | Staszewski et al. |
| 2003/0042985 A1 | 3/2003 | Shibahara et al. |
| 2003/0184350 A1 | 10/2003 | Wang et al. |
| 2004/0136440 A1 | 7/2004 | Miyata et al. |
| 2004/0165691 A1 | 8/2004 | Rana |
| 2005/0170787 A1 | 8/2005 | Yamamoto et al. |
| 2006/0103436 A1 | 5/2006 | Saitou et al. |
| 2006/0119402 A1 | 6/2006 | Thomsen et al. |
| 2006/0197614 A1 | 9/2006 | Roubadia et al. |
| 2006/0229018 A1 | 10/2006 | Mlinarsky et al. |
| 2006/0290391 A1 | 12/2006 | Leung et al. |
| 2007/0149144 A1 | 6/2007 | Beyer et al. |
| 2007/0247248 A1 | 10/2007 | Kobayashi et al. |
| 2008/0012647 A1* | 1/2008 | Risbo ............ H03L 7/093 331/16 |
| 2008/0043893 A1 | 2/2008 | Nagaraj et al. |
| 2008/0104435 A1 | 5/2008 | Pernia et al. |
| 2008/0129351 A1 | 6/2008 | Chawla |
| 2008/0246546 A1 | 10/2008 | Ha et al. |
| 2009/0083567 A1 | 3/2009 | Kim et al. |
| 2009/0140896 A1 | 6/2009 | Adduci et al. |
| 2009/0153252 A1 | 6/2009 | Chen et al. |
| 2009/0184857 A1 | 7/2009 | Furuta et al. |
| 2009/0231901 A1 | 9/2009 | Kim |
| 2009/0256601 A1 | 10/2009 | Zhang et al. |
| 2009/0262567 A1 | 10/2009 | Shin et al. |
| 2010/0007427 A1 | 1/2010 | Tomita et al. |
| 2010/0052798 A1 | 3/2010 | Hirai |
| 2010/0090731 A1 | 4/2010 | Casagrande |
| 2010/0109714 A1 | 5/2010 | Lindfors et al. |
| 2010/0164761 A1 | 7/2010 | Wan et al. |
| 2010/0194483 A1 | 8/2010 | Storaska et al. |
| 2010/0240323 A1 | 9/2010 | Qiao et al. |
| 2010/0323643 A1 | 12/2010 | Ridgers |
| 2011/0006936 A1 | 1/2011 | Lin et al. |
| 2011/0032013 A1 | 2/2011 | Nelson et al. |
| 2011/0095784 A1 | 4/2011 | Behel et al. |
| 2011/0234204 A1 | 9/2011 | Tamura et al. |
| 2011/0234433 A1 | 9/2011 | Aruga et al. |
| 2011/0264435 A1 | 10/2011 | Jamnejad et al. |
| 2011/0285575 A1 | 11/2011 | Landez et al. |
| 2011/0304490 A1 | 12/2011 | Janakiraman |
| 2012/0013406 A1 | 1/2012 | Zhu et al. |
| 2012/0161829 A1 | 6/2012 | Fernald |
| 2012/0200330 A1 | 8/2012 | Kawagoe et al. |
| 2012/0249207 A1 | 10/2012 | Natsume et al. |
| 2012/0262315 A1 | 10/2012 | Kapusta et al. |
| 2012/0297231 A1 | 11/2012 | Qawami et al. |
| 2012/0317365 A1 | 12/2012 | Elhamias |
| 2012/0328052 A1 | 12/2012 | Etemadi et al. |
| 2013/0002467 A1 | 1/2013 | Wang |
| 2013/0162454 A1 | 6/2013 | Lin |
| 2013/0194115 A1 | 8/2013 | Wu et al. |
| 2013/0211758 A1 | 8/2013 | Prathapan et al. |
| 2013/0300455 A1 | 11/2013 | Thirugnanam et al. |
| 2014/0029646 A1 | 1/2014 | Foxcroft et al. |
| 2014/0210532 A1 | 7/2014 | Jenkins |
| 2014/0327478 A1 | 11/2014 | Horng et al. |
| 2014/0347941 A1 | 11/2014 | Jose et al. |
| 2015/0028960 A1 | 1/2015 | Yorita |
| 2015/0162921 A1 | 6/2015 | Chen et al. |
| 2015/0180594 A1 | 6/2015 | Chakraborty et al. |
| 2015/0200649 A1 | 7/2015 | Trager et al. |
| 2015/0213873 A1 | 7/2015 | Joo et al. |
| 2016/0084895 A1 | 3/2016 | Imhof |
| 2016/0119118 A1 | 4/2016 | Shokrollahi |
| 2016/0162426 A1 | 6/2016 | Benjamin et al. |
| 2016/0211929 A1 | 7/2016 | Holden et al. |

OTHER PUBLICATIONS

"NB3W1200L: 3.3 V 100/133 MHz Differential 1:12 Push-Pull Clock ZDB/Fanout Buffer for PCIe", on Semiconductor, http://onsemi.com, Aug., 2013, Rev. 0, 26 Pages.

Texas Instruments "CDCEx913 Programmable 1-PLL VCXO Clock Synthesizer With 1.8-V, 2.5-V, and 3.3-V Outputs", Apr. 2015, pp. 1-36, pp. 11, 20-22.

Avramov, et al., "1.5-GHz Voltage Controlled Oscillator with 3% Tuning Bandwidth Using a Two-Pole DSBAR Filter", Ultrasonics, Ferroelectrics and Frequency Control. IEEE Transactions on. vol. 58., May 2011, pp. 916-923.

Hwang, et al., "A Digitally Controlled Phase-Locked Loop with a Digital Ohase- Frequency Detector for Fast Acquisition", IEEE Journal of Solid State Circuits, vol. 36, No. 10, Oct. 2001, pp. 1574-1581.

Kratyuk, et al., "Frequency Detector for Fast Frequency Lock of Digital PLLs", Electronic Letters, vol. 43, No. 1, Jan. 4, 2007, pp. 1-2.

Mansuri, "Fast Frequency Acquisition Phase-Frequency Detectors for GSamples/s Phase-Locked Loops", IEEE Journal of Solid-State Circuits, vol. 37 No. 10, Oct. 2002, pp. 1331-1334.

Niagaraju, "A Low Noise 1.5GHz VCO with a 3.75% Tuning Range Using Coupled FBAR's", IEEE International Ultrasonics Symposium (IUS), Oct. 2012, pp. 1-4.

(56) References Cited

OTHER PUBLICATIONS

Natanabe, "An All-Digital PLL for Frequency Multilication by 4 to 1022 with Seven-Cycle Lock Time", IEEE Journal of Solid-State Circuits, vol. 39 No. 2, Feb. 2003, pp. 198-204.

* cited by examiner

PULSE WIDTH MODULATION (PWM) TO ALIGN CLOCKS ACROSS MULTIPLE SEPARATED CARDS WITHIN A COMMUNICATION SYSTEM

CROSS-REFERENCE TO RELATED APPLICATIONS

This application claims priority to U.S. Provisional Application Ser. No. 62/281,332, filed Jan. 21, 2016, entitled, "PULSE WIDTH MODULATION (PWM) TO ALIGN CLOCKS ACROSS MULTIPLE SEPARATED CARDS WITHIN A COMMUNICATION SYSTEM", by Rodrigues et al., the disclosure of which is hereby incorporated herein by reference.

BACKGROUND OF THE INVENTION

Typically, communication equipment includes a backplane coupled between a plurality of line cards and one or more timing sources for providing clock signals to the plurality of line cards. To prevent system failures, the communication equipment often includes both an active timing card and a redundant timing card coupled to the plurality of line cards over the backplane. In operation, the active timing card acts as the timing master and generates clock signals that are distributed to the line cards in the communication equipment. These clock signals are distributed between and phase aligned across the line cards in the system over the backplane connecting the line cards to the active timing card.

Current and anticipated communication system require precise phase alignment within the egress and ingress ports of communication equipment. Current solutions known in the art employ static propagation delay compensation to align the clocks across the line cards. However, static propagation delay measurements, which are applied at the initialization of the timing device, are unable to compensate for temperature delay variations of the communication system over time, therefore making it difficult to meet the required precise phase alignment requirements of the egress and ingress ports of the communication equipment.

Accordingly, what is needed in the art is system and method for improved clock phase alignment at a plurality of line cards over a backplane of a communication system.

SUMMARY OF THE INVENTION

In various embodiments, the present invention provides a system and method for aligning the phase of clock signals across multiple line cards with a communication system. The system and method of the present invention allow for improved precision in the phase alignment of clock signals at the egress ports and ingress ports of equipment employed in a communication system.

In one embodiment, the present invention provides a method for phase alignment of a clock signal at a plurality of line cards, which includes generating a pulse-width modulated (PWM) clock output signal at a timing device, determining a propagation delay for each of a plurality of line cards following a round-robin approach and determining a phase delay correction for each of the plurality of line cards based upon the determined propagation delay for each of the plurality of line cards. The method further includes, encoding the phase delay correction for each of the plurality of line cards into the pulse-width modulated (PWM) clock output signal to generate a phase delay correction encoded PWM clock output signal for each of the plurality of line cards and transmitting the phase delay correction encoded PWM clock output signal to each of the plurality of line cards following the round-robin approach, thereby aligning the phase of the clocks received at the plurality of line cards.

In one exemplary embodiment, determining a propagation delay for each of the plurality of line cards may further include, transmitting a timing signal over a first backplane trace from the timing device to each of the plurality of line cards, receiving, at the timing device, a return timing signal from each of the plurality of line cards over a second backplane trace, measuring a round-trip delay time associated with each of the plurality of line cards using a ranging algorithm and the return timing signal and dividing the round-trip delay time associated with each of the plurality of line cards by half to determine the propagation delay for each of the plurality of line cards.

In another exemplary embodiment, determining a propagation delay for each of the plurality of line cards may include, transmitting a timing signal over a bidirectional backplane trace from the timing device to each of the plurality of line cards, receiving, at the timing device, a return timing signal from each of the plurality of line cards over the bidirectional backplane trace and measuring a time difference between transmitting the timing signal and receiving the return timing signal from each of the plurality of line cards using a ping-pong algorithm to determine the propagation delay for each of the plurality of line cards.

In various embodiments, the present invention also provides a timing device for performing phase alignment of a clock signal at a plurality of line cards, which may include a first digital phase-locked loop (DPLL) circuit for generating a pulse-width modulated (PWM) clock output signal, a processor implementing an algorithm for determining a propagation delay for each of a plurality of line cards following a round-robin approach, a second digital phase-locked loop (DPLL) circuit for determining a phase delay correction for each of the plurality of line cards based upon the determined propagation delay for each of the plurality of line cards and an PWM encoder coupled to the first DPLL circuit and to the second DPLL circuit, the PWM encoder for encoding the phase delay correction for each of the plurality of line cards into the pulse-width modulated (PWM) clock output signal to generate a phase delay correction encoded PWM clock output signal to be transmitted to each of the plurality of line cards.

In accordance with the present invention, a communication system for performing phase alignment of a clock signal at a plurality of line cards is provided, which may include a backplane, a plurality of line cards coupled to the backplane, at least one timing device coupled to the backplane. The timing device may further include a first digital phase-locked loop (DPLL) circuit for generating a pulse-width modulated (PWM) clock output signal, a processor implementing an algorithm for determining a propagation delay for each of a plurality of line cards following a round-robin approach, a second digital phase-locked loop (DPLL) circuit for determining a phase delay correction for each of the plurality of line cards based upon the determined propagation delay for each of the plurality of line cards and an PWM encoder coupled to the first DPLL circuit and to the second DPLL circuit, the PWM encoder for encoding the phase delay correction for each of the plurality of line cards into the pulse-width modulated (PWM) clock output signal to generate a phase delay correction encoded PWM clock output signal to be transmitted to each of the plurality of line cards over the backplane.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, regions, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
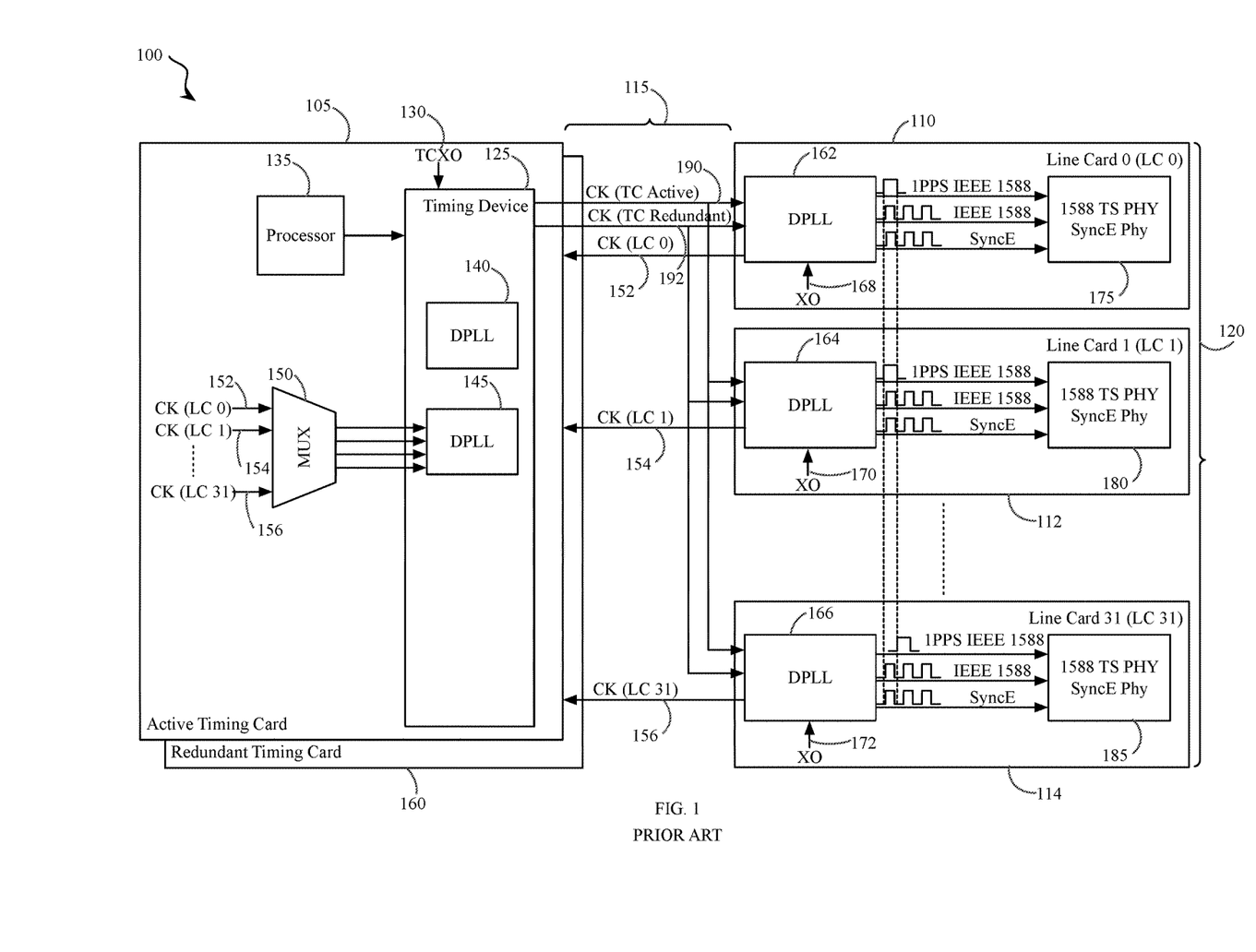
FIG. 1 is a block diagram of a prior art communication system containing a plurality of line cards coupled to a timing card across a backplane.

FIG. 1 illustrates a block diagram of an exemplary prior art communication system 100 comprising thirty-two line cards 120 coupled to an active timing card 105 and a redundant timing card 160 over a backplane 115. In this embodiment, three of the thirty-two line cards are illustrated as Line Card 0 110, Line Card 1 112 and Line Card 31 114. However, it is known in the art that the number of line cards can vary within a system. In typical communication equipment design, all of the line cards 120 are synchronized to the same clock. Thus, a failure of the clock negatively effects the data traffic on all of the line cards 120. To avoid this problem and increase network reliability, communication products are often designed with at least two clocks. In this embodiment, a clock signal is generated by the active timing card 105 and a second clock is implemented on the redundant timing card 160. If the clock on the active timing card 105 fails, the system avoids failure by switching to the clock on the redundant timing card 160. As shown in FIG. 1, the active timing card 105 may include a timing device 125 which receives a signal from an oscillator 130, such as a temperature controlled crystal oscillator, and a processor 135. The timing device 125 generates one or more clock signals to be distributed to the redundant timing card 160 and to the numerous line cards 120 over the backplane 115.

To generate the clock signals, the timing device on the active timing card 105 may include a first digital phase locked loop circuit (DPLL) 140 and a second digital phase locked loop circuit (DPLL) 145. In DPLL circuits 140, 145 provide a control system that generates an output signal whose phase is related to the phase of an input signal.

The first DPLL 140 may include an embedded digitally controlled oscillator (DCO) and may be designed to provide a clock signal for IEEE 1588 applications. The second DPLL 145 may be designed to provide clock signals in compliance with synchronous Ethernet (SyncE) applications. As known, prior art systems may employ SyncE, IEEE 1588 clocks and a 1 pulse-per-second (PPS) signals to help align the frame/timing pulses across line cards. In operation, the timing device 125 on the active timing card 105 and the redundant timing card 160 receives input clock signals 152, 154, 156 from the line cards 120 at a first multiplexer 150 and drives the active and redundant clocks onto the corresponding traces 190, 192 of the backplane 115. Each of the DPLLs 140, 145 on the active and redundant timing cards typically drives common clock frequencies, such as 8 kHz, 1.544 MHz, 2.048 MHz and 19.44 MHz, depending upon the specific timing applications required by the communication system. The active clock 190 and the redundant clock 192 are distributed via the backplane 115 to the line cards 120. As shown in FIG. 1, each of the line cards 110, 112, 114 includes a DPLL circuit 162, 164, 166 for receiving the clock signals 190, 192 and comparing the received clock signals 190, 192 to an input signal from an oscillator 168, 170, 172 associated with each of the DLPP circuits 162, 164, 166 to provide one or more application specific clock signals to a physical layer device 175, 180, 185 that is clocked by the associated the line card 110, 112, 114.

Ideally, the active and redundant clocks 190, 192 on the backplane should have the same frequency and phase and the phase difference between the clock signals at the various line cards, should be equal to zero. In order to achieve a phase difference in the range of +/−5 ns over temperature variations, current solutions known in the art employ static delay compensation techniques to align the clocks across the line cards 120. However, static delay measurements cannot compensate for temperature delay variations of the system, therefore making it very difficult to meet the desired precise alignment for applications which require very precise phase alignment within the egress and ingress ports of the communication equipment. In addition to temperature delay variations within the system, variations also exist among individual components themselves and across vendors. As such, variations in the static delay measurements may not be accurate across all components and component vendors, thereby negatively affecting the ability of the system to attain a precise phase alignment. Additionally, static delay measurements are a manual process requiring engineering time during the design phase, which is undesirable.

Figure 2:
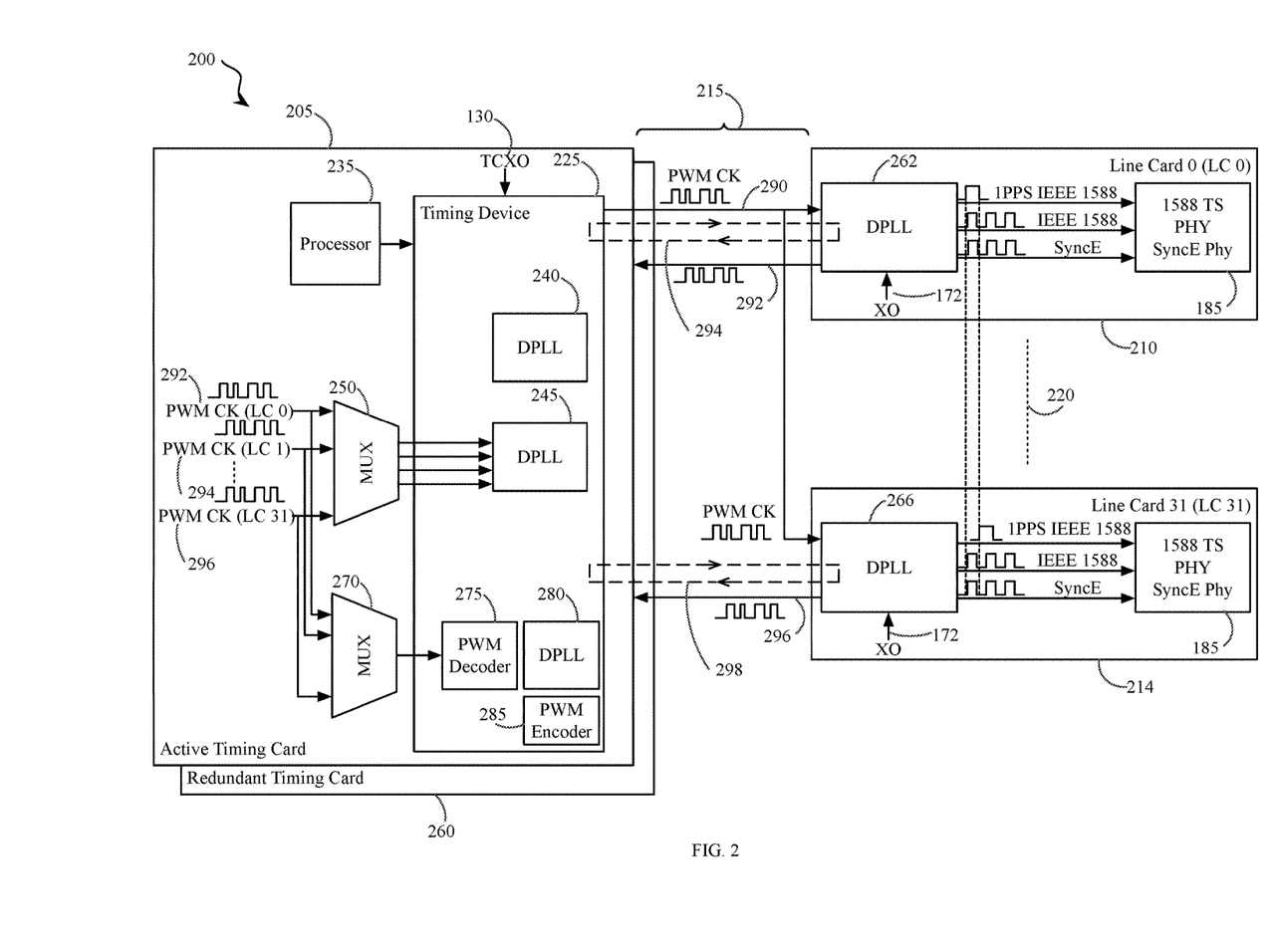
FIG. 2 is a block diagram of a communication system providing phase alignment of clocks at a plurality of line cards using a ranging algorithm with an existing backplane, in accordance with an embodiment of the present invention.

With reference to FIG. 2, in one embodiment of the present invention, a communication system 200 is illustrated for providing improved phase alignment of a clock signal at one or more line cards 220 over a backplane 215. It is known in the art that backplanes have a limited number of traces that can be used to transmit clock signals between the line cards 220 and the timing cards 205, 260. To accommodate the limited number of traces in the backplane, a pulse-width modulated (PWM) encoder 285 can be implemented within the timing device 225 to allow multiple clocks, synchronization pulses and data streams to be encoded for transmission using a single backplane trace. Pulse-width modulation is commonly known in the art as a method of encoding a sequence of values by modulating the duty cycle of a fixed-frequency carrier signal. In addition to the PWM encoder 285, a pulse-width modulated (PWM) decoder 275 is also included in the timing device 225 to allow the multiple clocks, synchronization pulses and data to be recovered at the timing device 225. By incorporating a PWM encoder 285 and a PWM decoder 275, it is not necessary for the communication system to have separate backplane traces for each of the clocks, synchronization pulses and data streams to be communicated to each of the plurality of line cards 220.

As shown in FIG. 2, in one embodiment, the clock pulse alignment at the line cards 220 of the communication system 200 can be improved by retrofitting the active timing card 205 to include a timing device 225 having a processor 235 for implementing a ranging algorithm for dynamically measuring a delay between the clock signals generated by the DPLLs 162, 166 associated with each of the line cards 210, 214 and a clock signal generated at the timing device 225. The delay that is dynamically measured by the timing device 225 can then be used to adjust the clock signals generated at each of the line cards 220 using the data channel provided by the encoded PWM clock signal.

In the backplane retrofit embodiment of FIG. 2, the timing device 225 performs phase alignment of the clock signal at each of the plurality of line cards 220. To perform phase alignment, the timing device 225 includes a first digital phase-locked loop (DPLL) circuit 245 for generating a pulse-width modulated (PWM) clock output signal and a processor 235 implementing a ranging algorithm for determining a propagation delay for each of a plurality of line cards, following a round-robin approach. The processor 235 may be integrated into the timing device 225, or alternatively, the processor 235 may reside on the active timing card 205 and be electrically coupled to the timing device 225. The timing device 225 further includes a second digital phase-locked loop (DPLL) circuit 280 and an PWM encoder 285 for determining a phase delay correction for each of the plurality of line cards 220 based upon the determined propagation delay for each of the plurality of line cards 220. The PWM encoder 285 is coupled to the first DPLL 245 and the second DPLL circuit 280 and is configured for encoding the phase delay correction for each of the plurality of line cards 220 into the pulse-width modulated (PWM) clock output signal to generate a phase delay correction encoded PWM clock output signal to be transmitted to each of the plurality of line cards 220. The phase delay correction encoded PWM clock output signal received at each of the plurality of line cards 220 is used to compensate for the propagation delay from the active timing card 205 to each of the line cards 220 and to correct the phase of the clock at the line cards 220.

Prior to generating the PWM clock output signal, the timing device 225 is initialized and locked to a specific frequency utilizing a first multiplexer 250 coupled to the first DPLL circuit 245. The first multiplexer 250 receives PWM clock signals 292, 294, 296 from line cards 220 and the first DPLL 245 monitors each of the PWM clock signals from each of the plurality of line cards 220 and locks the first digital phase-locked loop (DPLL) circuit 245 to the highest priority PWM clock signal that is not experiencing a failure to generate the PWM clock output signal. The PWM clock output signal from the first DPLL circuit 245 is then provided to the PWM encoder 275 prior to being distributed to the line cards as the phase delay correction encoded PWM clock output signal.

The propagation delay to be encoded into the PWM clock output signal for each of the line cards 220 is determined by the timing device 225 using a ranging algorithm implemented in the processor 235 and a round-trip delay time measured by the timing device 225. To determine the propagation delay, the first DPLL circuit 245 of the timing device 225 transmits a timing signal over a first backplane trace 290 from the timing device 225 to each of the plurality of line cards 220. Each of the plurality of line cards 220 then responds to the timing signal by sending a return timing signal over a second backplane trace 292. The second multiplexer 270 coupled to the second DPLL circuit 280 and to the processor 235 then receives the return timing signal from each of the plurality of line cards over a second backplane trace 292, 296. The ranging algorithm then measures a round-trip delay time 294, 298 associated with each of the plurality of line cards 120 based on the decoded return timing signal and divides the round-trip delay time associated with each of the plurality of line cards 220 by half to determine the propagation delay for each of the plurality of line cards 220. As such, in the particular embodiment illustrated in FIG. 2, with reference to a first line card 210 and a second line card 214, the timing device 225 transmits a timing signal over a first backplane trace 290 to the line cards 210, 214. The first line card 210 receives the timing signal at the DPLL circuit 262 of the line card and responds by sending a return timing signal across the second backplane trace 292. Additionally, the second line card 114 receives the timing signal at the DPPL circuit 266 of the line card and responds by sending a return timing signal across the second backplane trace 296. The return timing signals are received at the second multiplexer 270 and the second multiplexer 270 transmits each of the return timing signals to the PWM decoder 275 following a round-robin algorithm controlled by the processor 235. In one embodiment, the timing signal and the return timing signal are encoded with a time stamp indicating a time when the timing signal was transmitted to the line cards and a time when the return timing signal was transmitted to the timing device 225 from the line cards 220. The PWM decoder 275 decodes the return timing signals provided by the second multiplexer 270 and the ranging algorithm is implemented to measure the round-trip delay time for the line cards 210, 214 based upon the decoded time stamp from the return timing signal and the time stamp of the timing signal send by the timing device 225. The round-trip delay time is then divided in half to estimate the unique propagation delay associated with each of the line cards 210, 214. The second DPLL circuit 280 and the PWM encoder 285 are then used to generate the phase delay correction encoded PWM clock output signal to be provided to the line cards 210, 214 to compensate for the propagation delay and align the phase of the clock signal at the line cards 210, 214.

In order to be able to communicate the appropriate phase delay correction from the timing device 225 to each of the line cards 220, the processor is further configured for assigning a specific address to each of the plurality of line cards and the PWM encoder 285 is further configured for encoding the specific address of each of the plurality of line cards into the phase delay correction encoded PWM clock output signal to be transmitted to the plurality of line cards 220.

In the backplane retrofit embodiment 200, the propagation delay is estimated by assuming that the length of the first backplane trace for transmitting the timing signal and the length of the second backplane trace for transmitting the return timing signal are equal, and therefore, the round-trip time can be divided in half to arrive at a precise propagation delay associated with each of the line cards. However, as shown in FIG. 2, the length of the first backplane trace 290 between the timing device 225 and the second line card 214 is not equal to the length of the second backplane trace 298 between the second line card 214 and the timing device. As such, the assumption that the first backplane trace and the second backplane trace are of equal length does not hold true and the estimate of the propagation delay will include an error.

In the backplane retrofit embodiment 200, a round-robin approach is implemented to measure the round-trip delay times between the active timing card 205 and each of the line cards 220 in the communication equipment in an efficient manner. In the present invention, the round-robin approach implemented by the processor 235 and the second multiplexer 270 results in sequentially accessing the return timing signal from each of the line cards and generating an appropriate phase delay correction encoded PWM clock output signal for each of the line cards, in a sequential fashion. The benefit of the round-robin approach is that is avoids the need for separate point-to-point timing signal traces between the active timing card 205 and each of the line cards 220. Such a system supports existing communication system backplanes that share bus connections between the timing cards and the line cards.

Figure 3:
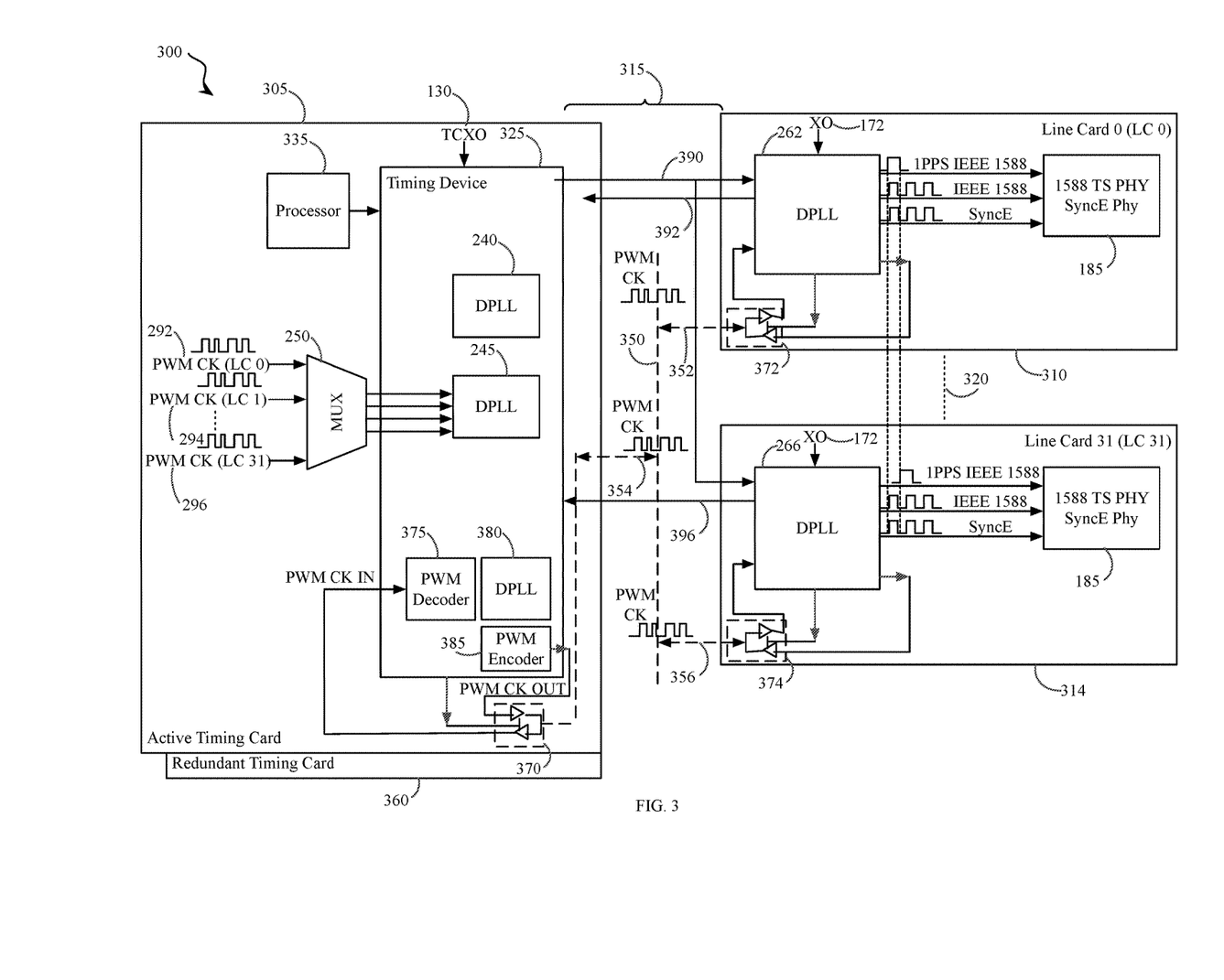
FIG. 3 is a block diagram of a communication system providing phase alignment of clocks at a plurality of line cards a ping-pong algorithm, in accordance with an embodiment of the present invention.

With reference to FIG. 3, in an additional embodiment of the present invention, more precise propagation delay estimations can be made for each of the plurality of line cards 320 by adding a dedicated clock trace to the backplane of the communication equipment 300 and utilizing a ping-pong algorithm implemented in the processor 335. This embodiment allows for compensation of static errors, such as line asymmetry and component asymmetry. In this embodiment, a communication system 300 is illustrated for providing improved phase alignment of a clock signal at one or more line cards 320 over a backplane 315. To accommodate the limited number of traces in the backplane, a pulse-width modulated (PWM) encoder 385 is implemented within the timing device 325 to allow multiple clocks, synchronization pulses and data streams to be encoded for transmission using a single backplane trace. In addition to the PWM encoder 385, a pulse-width modulated (PWM) decoder 375 is also included in the timing device 325 to allow the multiple clocks, synchronization pulses and data to be recovered at the timing device 325. By incorporating a PWM encoder 385 and a PWM decoder 375, it is not necessary for the communication system to have separate backplane traces for each of the clocks, synchronization pulses and data streams to be communicated to each of the plurality of line cards 320.

As shown in FIG. 3, in this embodiment, the clock pulse alignment at the line cards 320 of the communication system 300 is improved by incorporating a bidirectional backplane trace 350 into the backplane 315 of the communication system 300. The bidirectional backplane 350 is added to the backplane 315 while still maintaining the clock signal trace 390 between the timing device 325 and the line cards 320 and the clock signal traces 392, 396 between the line cards 320 and the timing device 325. As illustrated, this embodiment 300 provides a bidirectional connection 354 between the timing device 325 and the bidirectional backplane trace 350, a bidirectional connection 352 between the bidirectional backplane trace 350 and a first line card 310 and a bidirectional connection 356 between the bidirectional backplane trace 350 and a second line card 314. In combination, the bidirectional connections 352, 354, 356 constitute the bidirectional backplane 350 of the present invention. The timing signals transmitted from the timing device 325 to the plurality of line cards 320 and the return timing signals transmitted from the plurality of line cards 320 to the timing device 325 for measuring the propagation delay of the line cards 320 travel across the bidirectional backplane trace 350. In this embodiment, by utilizing a common bidirectional backplane trace 350 to transmit the timing signal and the return timing signals, the propagation delay in both directions is identical and as such, the propagation delay associated with each of the plurality of line cards 320 can be precisely measured.

As shown in FIG. 3, in this embodiment, the clock pulse alignment at the line cards 320 of the communication system 300 can be improved by incorporating a bidirectional backplane trace 350 and a processor 335 at the timing device 325 for implementing a ping-pong algorithm for dynamically measuring a delay between the clock signals generated by the DPLLs 162, 166 associated with each of the line cards 310, 314 and a clock signal generated at the timing device 325. The delay that is dynamically measured by the timing device 325 can then be used to adjust the clock signals generated at each of the line cards 320 using the data channel provided by the encoded PWM clock signal.

In the embodiment of FIG. 3, the timing device 325 performs phase alignment of the clock signal at each of the plurality of line cards 320. To perform phase alignment, the timing device 325 includes a first digital phase-locked loop (DPLL) circuit 245 for generating a pulse-width modulated (PWM) clock output signal and a processor 335 implementing a ranging algorithm for determining a propagation delay for each of a plurality of line cards, following a round-robin approach. The processor 335 may be integrated into the timing device 385, or alternatively, the processor 335 may reside on the active timing card 305 and be electrically coupled to the timing device 325. The timing device 325 further includes a second digital phase-locked loop (DPLL) circuit 380 and an PWM encoder 325 for determining a phase delay correction for each of the plurality of line cards 320 based upon the determined propagation delay for each of the plurality of line cards 320. The PWM encoder 385 is coupled to the first DPLL 245 and the second DPLL circuit 380 and is configured for encoding the phase delay correction for each of the plurality of line cards 320 into the pulse-width modulated (PWM) clock output signal to generate a phase delay correction encoded PWM clock output signal to be transmitted to each of the plurality of line cards 320. The phase delay correction encoded PWM clock output signal received at each of the plurality of line cards 320 is used to compensate for the propagation delay from the active timing card 305 to each of the line cards 320 and to correct the phase of the clock at the line cards 320.

Prior to generating the PWM clock output signal, the timing device 325 is initialized and locked to a specific frequency utilizing a first multiplexer 250 coupled to the first DPLL circuit 245. The first multiplexer 250 receives PWM clock signals 292, 294, 296 from line cards 120 and the first DPLL 245 monitors each of the PWM clock signals from each of the plurality of line cards 220 and locks the first digital phase-locked loop (DPLL) circuit 245 to the highest priority PWM clock signal that is not experiencing a failure to generate the PWM clock output signal. The PWM clock output signal from the first DPLL circuit 245 is then provided to the PWM encoder 285 prior to being distributed to the line cards as the phase delay correction encoded PWM clock output signal.

In the embodiment incorporating a bidirectional backplane trace 300 to determine the propagation delay for each of the line cards 320, a timing signal is transmitted over the bidirectional backplane trace 350 from the timing device 325 to each of the plurality of line cards 320. Each of the plurality of line cards 320 responds to the timing signal by transmitting a return timing signal over the same bidirectional backplane trace 350. In order to implement a round-robin processing of the return timing signals from the plurality of line cards 320, the timing device 325 includes a switching circuit 370 coupled between the PWM decoder 375 and the PWM encoder 385 and controlled by the processor 335. The switching circuit 370 implements a Time Division Multiplexing (TDM) scheme wherein independent signals are transmitted and received over the common bidirectional backplane trace 350 by synchronizing the switching circuit 370 at the timing device 325 with each of the corresponding switching circuits 372, 374 at each of the respective line cards 310, 314, so that each signal appears on the bidirectional backplane trace 350 for only a fraction of time, in an alternating pattern.

Utilizing TDM and a ping-pong algorithm implemented by the processor 335, the timing device 325 is effective in measuring a time difference between transmitting the timing signal and receiving the return timing signal from each of the plurality of line cards to determine the propagation delay for each of the plurality of line cards. In one embodiment, the timing signal and the return timing signal are encoded with a time stamp indicating a time when the timing signal was transmitted to the line cards and a time when the return timing signal was transmitted to the timing device 325 from the line cards 320. The PWM decoder 375 decodes the return timing signals provided through the switching circuit 370 and the ping-pong algorithm is implemented by the processor 335 to measure the propagation delay based upon the decoded time stamp from the return timing signal and the time stamp of the timing signal sent by the timing device 325. The second DPLL circuit 380 and the PWM encoder 385 are then used to generate the phase delay correction encoded PWM clock output signal to be provided to the line cards 310, 314 to compensate for the propagation delay and align the phase of the clock signal at the line cards 310, 314.

In order to be able to communicate the appropriate phase delay correction from the timing device 325 to each of the line cards 320, the processor is further configured for assigning a specific address to each of the plurality of line cards and the PWM encoder 385 is further configured for encoding the specific address of each of the plurality of line cards into the phase delay correction encoded PWM clock output signal to be transmitted to the plurality of line cards 320.

The present invention improves the precision of the clock phase alignment at the line cards because phase adjustments are continually being made for the clock signals at the line cards by dynamically measuring the propagation delay between the timing device and each of the plurality of line cards and communicating the appropriate phase adjustment to each of the line cards.

Figure 4:
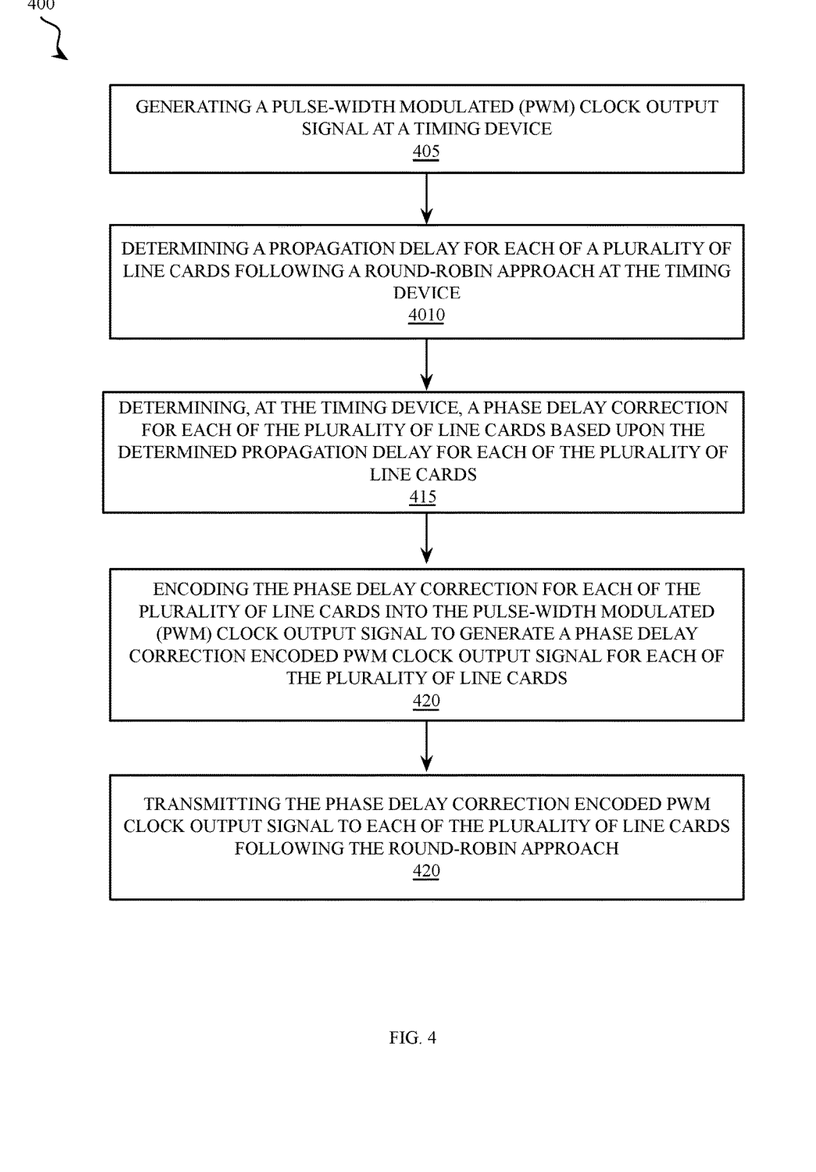
FIG. 4 is a flow diagram of a method for providing phase alignment of clock signals at a plurality of line cards, in accordance with an embodiment of the present invention.

FIG. 4 is a flow diagram of a method 400 for aligning the phase of clock signals at each of a plurality of line cards in a communication system, in accordance with an embodiment of the present invention.

At operation 405, the method includes generating a pulse-width modulated (PWM) clock output signal at a timing device. With reference to FIG. 2, in various embodiments, the PWM clock output signal is generated by the timing device 225 having an input signal from a crystal oscillator 130 and that is first frequency-locked to one of the PWM clock signals 292, 294, 296 from one of the plurality of line cards 220.

At operation 410, the method includes determining a propagation delay for each of a plurality of line cards following a round-robin approach at the timing device. With reference to FIG. 2, in one embodiment, the timing device 225 is coupled to each of the plurality of line cards 220 over a backplane 215 and the propagation delay may be determined by measuring the round-trip delay time between the timing device 225 and the line cards 120 by sequentially accessing each return signal from each of the line cards 120 using a multiplexer 270 and implementing a ranging algorithm in the processor 235. With reference to FIG. 3, in another embodiment, the timing device 325 is coupled to each of the plurality of line cards 320 over a bidirectional backplane trace 350 and the propagation delay may be determined by measuring the round-trip delay time between the timing device 325 and the line cards 320 by sequentially accessing each return signal from each of the line cards 320 using a Time Division Multiplexing switching device 370 and implementing a ping-pong algorithm in the processor 335.

At operation 415, following the determination of the propagation delay for each of the line cards, the method continues by determining, at the timing device, a phase delay correction for each of the plurality of line cards based upon the determined propagation delay for each of the plurality of line cards. With reference to FIG. 2 the phase delay correction may be determined by decoding the return timing signal from each of the line cards 220 at the PWM decoder 275 and identifying the phase delay correction using the second DPLL 280.

At operation 420, the method may continue by encoding the phase delay correction for each of the plurality of line cards into the pulse-width modulated (PWM) clock output signal to generate a phase delay correction encoded PWM clock output signal for each of the plurality of line cards. With reference to FIG. 2, the PWM encoder 285 may encode the phase delay correction into the PWM clock output signal to generate the phase delay correction encoded PWM clock output signal for each of the plurality of line cards 220.

At operation 425, the method continues by transmitting the phase delay correction encoded PWM clock output signal to each of the plurality of line cards following the round-robin approach. With reference to FIG. 2, the phase delay correction encoded PWM clock output signal is transmitted to each of the plurality of line cards 220 by the timing device 225 to accomplish improved phase alignment of the clock signals at each of the plurality of line cards.

The system and method of the present invention improve the precision of the clock phase alignment at the line cards over prior art systems, because phase adjustments are continually being made for the clock signals at the line cards by dynamically measuring the propagation delay between the timing device and each of the plurality of line cards and continuously communicating the appropriate phase adjustment to each of the line cards.

In one embodiment, the timing device and the communication system may be implemented in an integrated circuit as a single semiconductor die. Alternatively, the integrated circuit may include multiple semiconductor dies that are electrically coupled together such as, for example, a multi-chip module that is packaged in a single integrated circuit package.

In various embodiments, the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, microcontroller or general-purpose computer.

Unless specifically stated otherwise as apparent from the discussion, it is appreciated that throughout the description, discussions utilizing terms such as "measuring", "determining", "generating", "applying", "sending", "encoding", "locking", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What we claim is:

1. A method for phase alignment of a clock signal at a plurality of line cards, the method comprising:
    receiving a pulse-width modulated (PWM) clock signal from each of the plurality of line cards at a timing device;
    monitoring each of the PWM clock signals from each of the plurality of line cards;
    locking a first digital phase-locked loop (DPLL) circuit to a highest priority PWM clock signal that is not experiencing a failure to generate a PWM clock output signal;
    determining a propagation delay for each of a plurality of line cards following a round-robin approach at the timing device, the timing device coupled to each of the plurality of line cards over a backplane;
    determining, at the timing device, a phase delay correction for each of the plurality of line cards based upon the determined propagation delay for each of the plurality of line cards;
    encoding the phase delay correction for each of the plurality of line cards into the PWM clock output signal to generate a phase delay correction encoded PWM clock output signal for each of the plurality of line cards; and
    transmitting the phase delay correction encoded PWM clock output signal to each of the plurality of line cards following the round-robin approach.

2. A method for phase alignment of a clock signal at a plurality of line cards, the method comprising:
    generating a pulse-width modulated (PWM) clock output signal at a timing device;
    transmitting a timing signal over a first backplane trace from the timing device to each of the plurality of line cards, the timing device coupled to each of the plurality of line cards over a backplane;
    receiving, at the timing device, a return timing signal from each of the plurality of line cards over a second backplane trace;
    measuring a round-trip delay time associated with each of the plurality of line cards using a ranging algorithm and the return timing signal;
    dividing the round-trip delay time associated with each of the plurality of line cards by half to determine the propagation delay for each of the plurality of line cards;
    determining, at the timing device, a phase delay correction for each of the plurality of line cards based upon the determined propagation delay for each of the plurality of line cards;
    encoding the phase delay correction for each of the plurality of line cards into the PWM clock output signal to generate a phase delay correction encoded PWM clock output signal for each of the plurality of line cards; and
    transmitting the phase delay correction encoded PWM clock output signal to each of the plurality of line cards following the round-robin approach.

3. The method of claim 2, wherein the round-robin approach comprises sequentially accessing each of the plurality of line cards using a multiplexer of the timing device.

4. A method for phase alignment of a clock signal at a plurality of line cards, the method comprising:
    generating a pulse-width modulated (PWM) clock output signal at a timing device that is coupled to each of the plurality of line cards over a backplane;
    transmitting a timing signal over a bidirectional backplane trace from the timing device to each of the plurality of line cards;
    receiving, at the timing device, a return timing signal from each of the plurality of line cards over the bidirectional backplane trace;
    measuring a time difference between transmitting the timing signal and receiving the return timing signal from each of the plurality of line cards using a ping-pong algorithm to determine a propagation delay for each of the plurality of line cards;

determining, at the timing device, a phase delay correction for each of the plurality of line cards based upon the determined propagation delay for each of the plurality of line cards;
encoding the phase delay correction for each of the plurality of line cards into the PWM clock output signal to generate a phase delay correction encoded PWM clock output signal for each of the plurality of line cards; and
transmitting the phase delay correction encoded PWM clock output signal to each of the plurality of line cards following the round-robin approach.

5. The method of claim 4, wherein the round-robin approach comprises sequentially accessing each of the plurality of line cards using Time Division Multiplexing (TDM) on the bidirectional backplane trace.

6. A method for phase alignment of a clock signal at a plurality of line cards, the method comprising:
generating a pulse-width modulated (PWM) clock output signal at a timing device;
decoding a return clock signal from each of the plurality of line cards prior to determining a propagation delay for each of a plurality of line cards following a round robin approach at the timing device, the timing device coupled to each of the plurality of line cards over a backplane;
determining the propagation delay for each of the plurality of line cards following the round-robin approach at the timing device;
determining, at the timing device, a phase delay correction for each of the plurality of line cards based upon the determined propagation delay for each of the plurality of line cards;
encoding the phase delay correction for each of the plurality of line cards into the PWM clock output signal to generate a phase delay correction encoded PWM clock output signal for each of the plurality of line cards;
transmitting the phase delay correction encoded PWM clock output signal to each of the plurality of line cards following the round-robin approach.

7. A method for phase alignment of a clock signal at a plurality of line cards, the method comprising:
generating a pulse-width modulated (PWM) clock output signal at a timing device;
determining a propagation delay for each of a plurality of line cards following a round-robin approach at the timing device, the timing device coupled to each of the plurality of line cards over a backplane;
determining, at the timing device, a phase delay correction for each of the plurality of line cards based upon the determined propagation delay for each of the plurality of line cards;
encoding the phase delay correction for each of the plurality of line cards into the PWM clock output signal to generate a phase delay correction encoded PWM clock output signal for each of the plurality of line cards;
assigning a specific address to each of the plurality of line cards and encoding the specific address of each of the plurality of line cards into the phase delay correction encoded PWM clock output signal; and
transmitting the phase delay correction encoded PWM clock output signal to each of the plurality of line cards following the round-robin approach.

8. A timing device for performing phase alignment of a clock signal at a plurality of line cards, the timing device comprising:
a first multiplexer for receiving a PWM clock signal from each of the plurality of line cards;
a first digital phase-locked loop (DPLL) circuit coupled to the first multiplexer, for monitoring each of the PWM clock signals from each of the plurality of line cards and for locking the first DPLL circuit to a highest priority PWM clock signal that is not experiencing a failure to generate a pulse-width modulated (PWM) clock output signal;
a processor implementing an algorithm for determining a propagation delay for each of the plurality of line cards following a round-robin approach;
a second DPLL circuit for determining a phase delay correction for each of the plurality of line cards based upon the determined propagation delay for each of the plurality of line cards; and
an PWM encoder coupled to the first DPLL circuit and to the second DPLL circuit, the PWM encoder for encoding the phase delay correction for each of the plurality of line cards into the PWM clock output signal to generate a phase delay correction encoded PWM clock output signal to be transmitted to each of the plurality of line cards.

9. A timing device for performing phase alignment of a clock signal at a plurality of line cards, the timing device comprising:
a first digital phase-locked loop (DPLL) circuit for generating a pulse-width modulated (PWM) clock output signal, wherein the first DPLL circuit is further for transmitting a PWM timing signal over a first backplane trace from the timing device to each of the plurality of line cards;
a processor implementing an algorithm for determining a propagation delay for each of the plurality of line cards following a round-robin approach;
a second DPLL circuit for determining a phase delay correction for each of the plurality of line cards based upon the determined propagation delay for each of the plurality of line cards;
a second multiplexer coupled to the second DPLL circuit and to the processor, the second multiplexer for receiving, a PWM return timing signal from each of the plurality of line cards over a second backplane trace;
an PWM encoder coupled to the first DPLL circuit and to the second DPLL circuit, the PWM encoder for encoding the phase delay correction for each of the plurality of line cards into the PWM clock output signal to generate a phase delay correction encoded PWM clock output signal to be transmitted to each of the plurality of line cards; and
wherein the algorithm implemented by the processor is a ranging algorithm for measuring a round-trip delay time associated with each of the plurality of line cards based on the PWM return timing signal and for dividing the round-trip delay time associated with each of the plurality of line cards by half to determine the propagation delay for each of the plurality of line cards.

10. The timing device of claim 9, wherein the round-robin approach is implemented by the processor and comprises sequentially accessing each of the plurality of line cards using the second multiplexer.

11. A timing device for performing phase alignment of a clock signal at a plurality of line cards, the timing device comprising:

a first digital phase-locked loop (DPLL) circuit for generating a pulse-width modulated (PWM) clock output signal wherein the first DPLL circuit is further for transmitting a timing signal over a bidirectional backplane trace from the timing device to each of the plurality of line cards;

a processor implementing an algorithm for determining a propagation delay for each of the plurality of line cards following a round-robin approach;

a second DPLL circuit for determining a phase delay correction for each of the plurality of line cards based upon the determined propagation delay for each of the plurality of line cards;

an PWM encoder coupled to the first DPLL circuit and to the second DPLL circuit, the PWM encoder for encoding the phase delay correction for each of the plurality of line cards into the PWM clock output signal to generate a phase delay correction encoded PWM clock output signal to be transmitted to each of the plurality of line cards;

a switching circuit for receiving a return timing signal from each of the plurality of line cards over the bidirectional backplane trace; and wherein the algorithm implemented by the processor is a ping-pong algorithm for measuring a time difference between transmitting the timing signal and receiving the return timing signal from each of the plurality of line cards to determine the propagation delay for each of the plurality of line cards.

12. The timing device of claim 11, wherein the round-robin approach is implemented by the processor and comprises sequentially accessing each of the plurality of line cards using Time Division Multiplexing (TDM) on the bidirectional backplane trace.

13. A timing device for performing phase alignment of a clock signal at a plurality of line cards, the timing device comprising:

a first digital phase-locked loop (DPLL) circuit for generating a pulse-width modulated (PWM) clock output signal:

a PWM decoder for decoding a return clock signal from each of the plurality of line cards prior to determining a propagation delay for each of a plurality of line cards following a round robin approach at the timing device;

a processor implementing an algorithm for determining the propagation delay for each of the plurality of line cards following the round-robin approach;

a second DPLL circuit coupled to the PWM decoder for determining a phase delay correction for each of the plurality of line cards based upon the determined propagation delay for each of the plurality of line cards;

an PWM encoder coupled to the first DPLL circuit and to the second DPLL circuit the PWM encoder for encoding the phase delay correction for each of the plurality of line cards into the PWM clock output signal to generate a phase delay correction encoded PWM clock output signal to be transmitted to each of the plurality of line cards.

14. A timing device for performing phase alignment of a clock signal at a plurality of line cards, the timing device comprising:

a first digital phase-locked loop (DPLL) circuit for generating a pulse-width modulated (PWM) clock output signal;

a processor implementing an algorithm for determining a propagation delay for each of the plurality of line cards following a round-robin approach, wherein the processor is further configured for, assigning a specific address to each of the plurality of line cards;

a second DPLL circuit for determining a phase delay correction for each of the plurality of line cards based upon the determined propagation delay for each of the plurality of line cards; and an PWM encoder coupled to the first DPLL circuit and to the second DPLL circuit, the PWM encoder for encoding the phase delay correction for each of the plurality of line cards into the PWM clock output signal to generate a phase delay correction encoded PWM clock output signal to be transmitted to each of the plurality of line cards, and the PWM encoder further configured for encoding the specific address of each of the plurality of line cards into the phase delay correction encoded PWM clock output signal.

* * * * *

UNITED STATES PATENT AND TRADEMARK OFFICE
CERTIFICATE OF CORRECTION

Page 1 of 1

PATENT NO. : 10,075,284 B1
APPLICATION NO. : 15/364602
DATED : September 11, 2018
INVENTOR(S) : Silvana Rodrigues et al.

It is certified that error appears in the above-identified patent and that said Letters Patent is hereby corrected as shown below:

In the Drawings

In drawing sheet 4 of 4, in FIG. 4, in the second block from the top, replace the number "4010" with the number --410--.

In drawing sheet 4 of 4, in FIG. 4, in the fifth block from the top, replace the number "420" with the number --425--.

In the Claims

In Claim 13, Column 15, Line 40, delete ":" and insert --;--.

In Claim 13, Column 16, Line 9, after the phrase "cards;" insert --and--.

Signed and Sealed this
First Day of January, 2019

Andrei Iancu
*Director of the United States Patent and Trademark Office*